Dec. 4, 1945.   R. J. SHARP   2,390,186
PORTABLE WHIPPING MACHINE
Filed Nov. 17, 1944   2 Sheets-Sheet 2

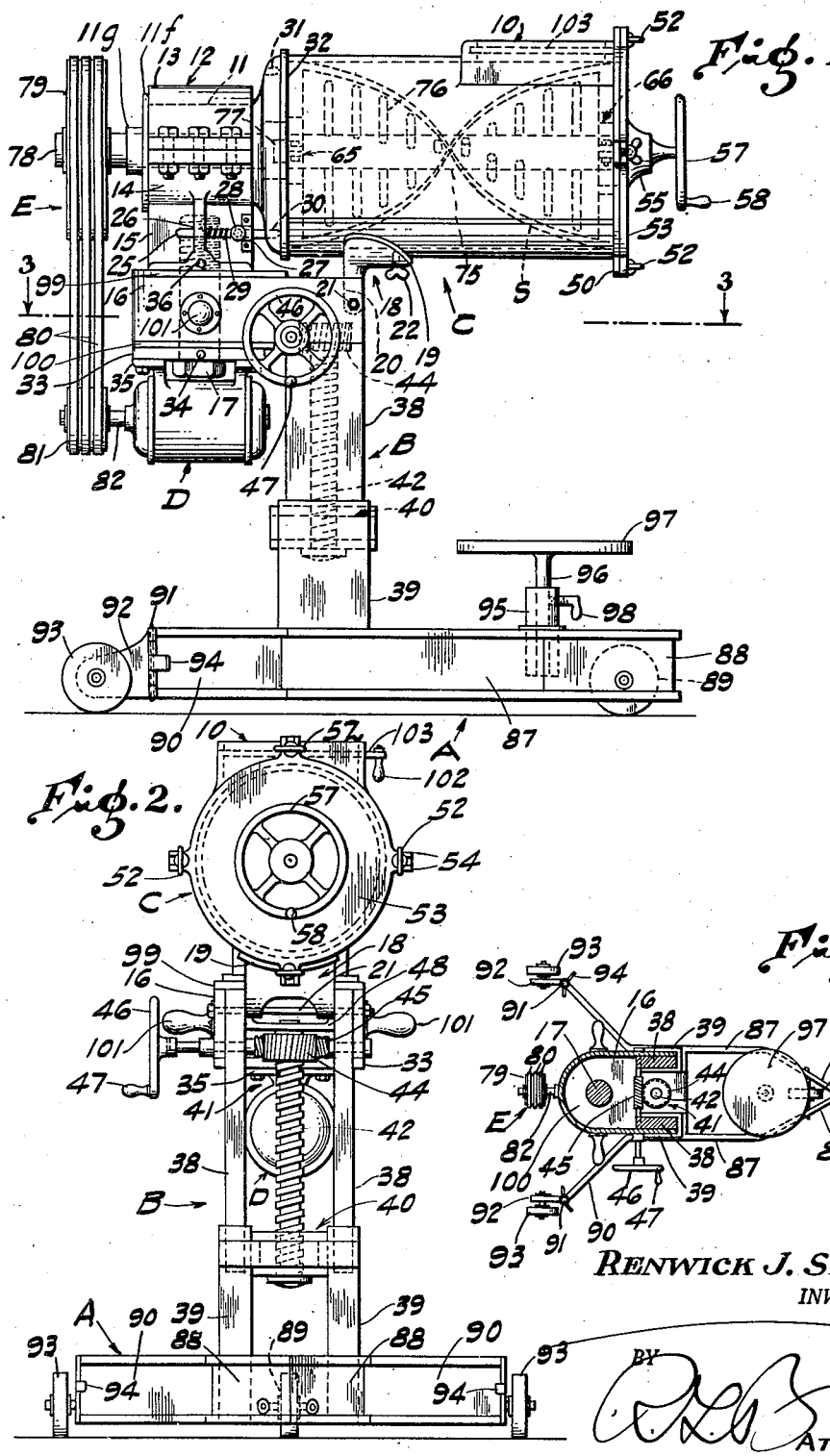

RENWICK J. SHARP,
INVENTOR.

BY
ATTORNEY

Patented Dec. 4, 1945

2,390,186

UNITED STATES PATENT OFFICE 2,390,186

PORTABLE WHIPPING MACHINE

Renwick J. Sharp, Guatemala, Guatemala

Application November 17, 1944, Serial No. 563,850

11 Claims. (Cl. 259—44)

This invention relates to a machine for whipping tough nougats, frappes and the lighter type substances such as marshmallow, cream and mayonnaise.

Objects of the invention are: to provide a machine for whipping in an improved manner more or less liquid edibles and/or to effect an improved agitation or mixing thereof; to provide an all-purpose mixer and whipper, wherein the entire whipping mechanism is elevated and lowered at will and wherein the entire whipping tank may be rotated in opposite directions in order to dump the load onto table tops at either side of an aisle along which the device is movable; this portability of the device adapting it for being conducted to the fires where the syrups are heated, instead of carrying the hot syrups long distances to the machine; to provide a machine possessing the advantage of being self cleaning due to the incorporation of automatically operated scraping bars which rub the sides and ends of the machine or are manually operated, during the mixing operation, by turning a hand wheel exterior of the tank.

More specific objects of the invention are: to provide an improved beater wherein the whipping rods are mounted upon the mixer shaft in a corkscrew or serpentine fashion from one extremity to the other, thus avoiding one-sided slapping of the syrups or mixes so common in ordinary mixers or beaters. In the latter connection there is less wear on belts and motive power due to the evenness in which the mix is beaten; and to provide in a machine of the character stated an unusual assembly of novel combination and arrangement of parts better suited to perform the functions for which a device of this character is intended.

Other objects, advantages and features of invention will hereinafter appear.

Referring to the accompanying drawings, which illustrate what is at present deemed to be a preferred embodiment of the invention, Fig. 1 is a side elevation of the complete apparatus.

Fig. 2 is an end elevation looking from right to left of Fig. 1.

Fig. 3 is a horizontal section on line 3—3 of Fig. 1, on a reduced scale.

Figure 4:
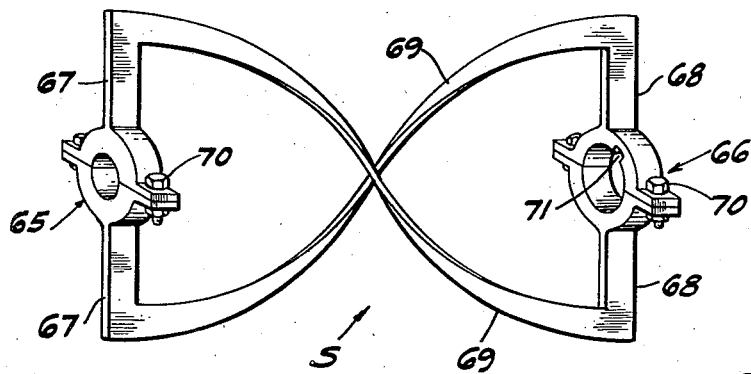
Fig. 4 is an enlarged perspective view of the scraper, separately shown.

Referring in detail to the drawings, the main parts of the apparatus are, the portable, elongated base A, tubular extensible standard B upstanding from said base at one side of the midlength thereof, the tubular treating tank C carried by said standard, the motor D also carried by said standard, and the power transmitting means E whereby said motor is operatively connected with the treating mechanism contained within said tank.

The tank C is turnable about a horizontal axis for a distance of 180 degrees in either direction from its normal position so as to swing its intake and discharge hopper portion 10 to a downwardly directed position for dumping purposes. With this end in view said tank is provided at its left end as viewed in Fig. 1 with a large cylindrical extension 11 turnably contained within the main journal 12, which is of a conventional two-part character, comprising a cap 13 bolted to a base 14, said base, in turn, being provided with a foot portion 15 seated for turnable adjustment upon the adjacent portion of the vertically adjustable standard body 16. Said foot portion 15 of the bearing section 14 has leading upwardly into it a screwthreaded socket into which screws the threaded portion of an axis bolt 17 around which the tank C, motor D and power transmission E are turnable.

As an auxiliary support for the horizontally offset tank C a brace 18 is provided thereunder, said brace having a saddle portion 19 to underlie the tank and a downwardly directed leg 20 swingably attached at 21 to the standard body 16. Said saddle portion 19 is provided with a winged screw 22 to seat within a suitable recess provided therefor in the bottom of the tank. This nut is loosened and said saddle swung downwardly preparatory to either turning the tank about its horizontal axis for dumping, or for turning it in a horizontal plane.

As an additional means for preventing the tank from rotating about its axis a horizontally slidable bolt 25 is provided having bearings 26 and 27 in the aforesaid foot portion 15, said bolt having an operating handle 28 and being normally held by a spring 29 in engagement with socket 30 or 31 formed in a circular member 32 intervening between the body portion of the tank C and the journal 12.

The motor D has an upwardly directed bedplate 33 which is apertured to receive the axis bolt 17 and rests upon the inner side of its head, said bedplate being fastened to the bolt by a pin 34 to turn therewith when the motor and tank are bodily swung in a horizontal plane around said axis bolt. The motor is shown having hanger brackets 35 bolted to said bedplate at opposite sides of the head of the axis bolt. Above the standard body 16 a pin 36 prevents rotation between the axis bolt 17 and the foot portion 15 of the bearing section 14.

The vertically adjustable standard body 16 carries a pair of downwardly directed limbs 38 slidably related to the tubular standard posts 39. A crosshead 40 is fixed to and between the upper portions of said posts 39.

A conventional gear mechanism 41 is provided for rotating a vertical screw shaft 42 within a threaded bore provided therefor in the crosshead 40 to elevate and lower the standard body 16. This gear mechanism includes a worm gear 44 fixed to the screw shaft 42, said gear meshing with a worm 45 operated by a handwheel 46 having a handle portion 47. Cross bar 48 extending between limbs 38 forms a bearing for the upper end of the screw shaft 42 (see Fig. 2).

Figure 5:
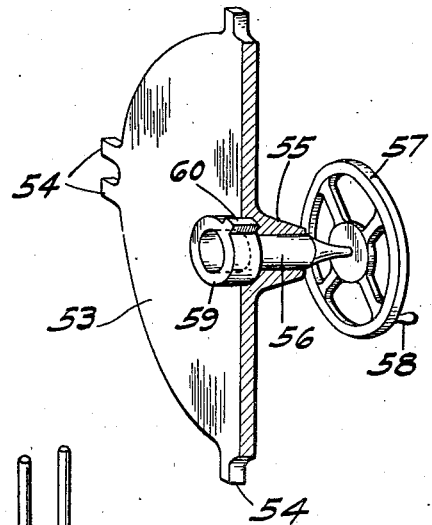
Fig. 5 is an enlarged, sectional perspective illustrating a portion of the operating and mounting means for the scraper.

The outer end of the cylindrical tank C is surrounded by a radial flange 50 having circumferentially spaced apart screwthreaded sockets with which cooperate winged screws 52 whereby a cover plate 53 is detachably secured to the tank, said cover plate having pairs of juxtaposed ears 54 with which said winged screws cooperate. Said cover plate, best shown in Fig. 5, has a central, apertured, outwardly projecting boss 55 with an axial bearing passage through it within which is turnably fitted a stub-shaft 56 having a tapered outer end portion to which is fixed a handwheel 57 carrying a handle 58. Said stub-shaft 56 has a diametrically enlarged inner end portion 59 furnished with a key lug 60 which projects radially outward therefrom.

In Fig. 4 is detailed a scraper S having at one end a two-part bearing portion 65 and at its opposite end a similar bearing structure 66. Integral with the bearing structure 65 are diametrically opposite, twin radial arms 67, like arms 68 being integral with the bearing structure 66. This scraper member is completed by means of spirally shaped twin scraper blades 69 united to the arms 67 and 68 as shown, and the bolt and nut fastening means 70.

Figure 6:
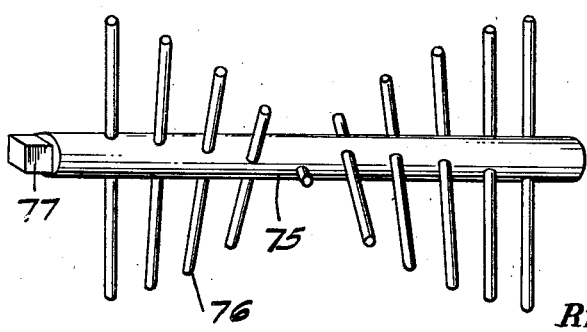
Fig. 6 is an enlarged perspective view of the beater member.

The bearing member 66 has an internal notch or groove 71 shaped and positioned to cooperate with the key lug 60 (Fig. 5) of the inner part 59 of the stub-shaft 56 when the annular bearing 66 is telescoped over said part 59. At the opposite end of the tank the bearing member 65 of the scraper fits turnably around the adjacent end of the shaft 75 of the beater which, as best shown in Fig. 6, has diametrically extending through it a series of spirally arranged beater rods 76.

The outer end of the beater shaft 75 is circular and is rotatably fitted within the bearing afforded by the recessed part 59 of the stub-shaft 56, but the opposite end of the shaft 75 has a squared portion 77 which fits within a square socket provided for it in the adjacent end of a power transmission shaft 78 for which a central bearing passage is provided through the cylindrical tank extension 11. Said shaft has a pulley 79 fixed to it driven by a multiple V-belt arrangement 80 from the driving pulley 81 fixed to the shaft 82 of the motor D.

The frame of the portable base A is shown comprising a wheel-carrying I beam member having parallel side portions 87 with converging portions 88 which join each other at the front end, the front wheel 89 being supported by and between the latter beam portions; and diverging rear portions 90. To the outer ends of said portions 90 are hinged at 91 arms 92 which are swingable in a horizontal plane to permit the rear ground wheels 93 they carry to be trailed in such a manner as not to impede turning movements of the portable base A. The arms 92 carry stop fingers 94 abuttable against the beam portions 90 to limit the swing of the arms 92.

Near its front end the portable base A carries a tubular standard 95 within which is fitted for vertical adjustment the leg 96 of a table top 97, said leg being maintained in the desired vertically adjustable position by means of a thumb screw 98. Said table top is vertically beneath the hopper 10 of the cylindrical tank when the latter is positioned as shown in Fig. 1, so that, by rotating the tank half a turn about its axis and then withdrawing the cover from the hopper the contents of the tank may be dumped into a container supported upon said table top.

The cylindrical tank extension 11 is provided with a peripheral flange 11f at its outer end and also with a central bearing extension 11g, these two parts being integral therewith, so when the cap portion of the journal structure is bolted in place the various mechanically rotatable and manually turnable parts are maintained in their assembled relation.

Referring to other structural details, between the foot portion 15 of the journal structure 14 and the hollow standard body 16 (see also Fig. 3), is interposed a wearing plate 99 welded to the upper edge of said standard body 16. Also between the hollow standard body 16 and the bed plate 33 of the motor is interposed a wearing plate 100, welded to the lower edge of said standard body 16. These two plates provide adequate bearing surfaces when it is desired to rotate the units C, D and E about axis of bolt 17.

When it is desired to move the machine as a whole the operator will grasp one or both of handles 101 secured to the standard body 16.

Relative to the operation, considering the device in the position shown in Fig. 1, the hopper 10 is facing upwardly in position for the material to be introduced therethrough into the tank C for treating. Since the volumes of certain types of materials to be treated increase as much as 300% when they are whipped, the tank C must be not filled to such an extent as to interfere with this expansion. When treating hot syrups, marshmallow and frappes, the machine will be lowered by operation of the hand wheel 46 in order to avoid using a step-ladder in carrying the hot liquids up to the hopper, which act would increase the danger of the operator being burned. As a further safeguard against burns while introducing and removing mixes, the hopper is made very commodious.

Preparatory to filling the mix into the hopper, the cover 53 will be screwed tightly onto the outer end of the tank, the saddle or brace 18 will be screwed up tightly and the sliding bolt 25 will be inserted into the aperture 30 of the circular member 32.

The power will then be turned on and the mass whipped, this operation taking place at the point most convenient to the material to be supplied, as for example, close to the stoves where the syrups are heated, thereby avoiding having to haul kettles of hot syrup from remote points to where the machine is located.

After the whipping or beating has been completed the power is turned off and the machine is pushed by means of the handles 101 to the table tops onto which the mass is to be poured. When the tank C has been brought to an overhanging position in relation to the selected table, the set screw 22 under the tank is loosened, the saddle 19 is swung downwardly out of the way, the bolt 25 is retracted and the tank C is then rotated 180 degrees in either direction thus bringing the upper aperture 31 (Fig. 1) into registry with the bolt 25, then the hand wheel 46 is turned in the proper direction to lower the tank so as to bring the hopper down as close as desired to said table top, whereupon the hopper handle 102 is operated to withdraw the hopper cover 103, causing the contents of the tank to be discharged through the downwardly directed hopper 10, onto the underlying table. In order to discharge that portion of the contents of the tank which adheres to its walls the hand wheel 57 will be rotated in the direction opposite to that in which the material was whipped, thereby dragging the last adhering residues to the edge of the hopper to fall therefrom onto the table.

Should it be desired to retrieve the beaten mass the machine need not be moved from the spot where the whipping took place, since the adjustable stand 97 can serve to support an empty container to receive the mass for future use.

It should be understood that the present disclosure is for the purpose of illustration only and that this invention includes all modifications and equivalents which fall within the scope of the subject matter claimed.

What is claimed is:

1. A whipping machine of the kind described comprising an elongated base, ground wheels whereon said base is portably supported, a standard carried by said elongated base nearer to one than to the opposite end thereof, whipping mechanism mounted upon said standard, said whipping mechanism comprising a tank to contain the substance to be whipped, said tank being positioned in an offset relation upon and to said standard at the side thereof which is nearest to the midlength of the aforesaid elongated base, and a saddle pivotally connected to said standard for movement to and from a supporting relation to the offset portion of said tank.

2. The subject matter of claim 1 and, a tubular standard carried by said base adjacent the end opposite that which carries the first said standard, and a table top provided with a leg fitted for vertical adjustment in said tubular standard, said tank having an opening in its normally upper side and being turnable about a horizontal axis to direct said opening downwardly for discharging the contents of the tank therethrough into a container supported upon said table top.

3. In a machine of the kind described, a cylindrical tank having an axial bearing passage through one of its ends, a stub shaft fitted within said passage and manually turnable from the exterior of the tank, said stub shaft having at its inner end a tubular head provided with an inner bearing surface, a rotatable stirrer within said tank having a central shaft one end of which has its bearing interiorly of said tubular head, and a scraper comprising a central annular bearing member at each end, one of said bearing members being fitted around said head of said stub shaft in an interlocked relation thereto to rotate therewith and the opposite annular bearing member of said scraper being loosely mounted upon said stirrer shaft, said stirrer having radial arms whose extremities are spaced considerably inwardly from the side wall of said tank and said scraper having radial arms which carry scraping blades which are rotatable through the space intervening between the outer ends of said stirrer arms and the tank wall.

4. A whipping machine of the kind described comprising an elongated base, ground wheels whereon said base is portably mounted, a standard carried by said base nearer to one than to the opposite end thereof, whipping mechanism mounted upon said standard, said whipping mechanism comprising a tank to contain the substance to be whipped, said tank being positioned in an offset relation upon and to said standard at the side thereof which is nearest to the midlength of the aforesaid base, whereby said tank is positionable vertically above a table top while that portion of the base which is vertically below the tank is in an underlying relation to such table top, said tank having an opening in its normally upper side and being turnable about a horizontal axis to direct said opening downwardly for discharging the contents of the tank therethrough, and a saddle pivotally connected to said standard for movement to and from a supporting relation to the offset portion of said tank.

5. A whipping mechanism of the kind described comprising a base, a standard carried by said base, whipping mechanism mounted upon said standard, said whipping mechanism comprising an elongated horizontally extending tank to contain the substance to be whipped, a rotatable beater within said tank, and driving mechanism including a motor and forming part of an assembly which includes said tank and beater, the greater part of the length of said tank being at one side of said standard and said motor and driving mechanism being located at the opposite side of said standard, thereby to equilibrate the weight of said assembly upon said standard, said tank having a discharge opening in the end portion thereof farthest from said motor and driving mechanism, a saddle pivotally connected to said standard for movement to and from a supporting relation to the end of the tank having the greatest overhang, and means connecting said assembly with said standard to rotationally adjust said assembly in relation to said base about a vertical axis.

6. The subject matter of claim 5, and said standard having a body portion provided at its upper end with a lateral extension in a vertically spaced relation to said base and said vertical axis being located in said extension in a horizontally spaced relation to said body portion.

7. The subject matter of claim 5, and said standard having a body portion provided at its upper end with a lateral extension in a vertically spaced relation to said base and said vertical axis being located in said extension in a horizontally spaced relation to said body portion, said motor being in a subjacent relation to said lateral extension of said body portion of the standard, the aforesaid means for rotationally adjusting the assembly about a vertical axis including an axis bolt having a bearing in said lateral extension.

8. The subject matter of claim 4, and means for maintaining said tank in its various adjusted positions, said means comprising a horizontally spring pressed bolt carried by the machine and having an end portion engageable within sockets located in an end portion of said tank.

9. A whipping machine of the kind described comprising an elongated base, ground wheels whereon said base is portably supported, a standard carried by said base nearer to one than to the opposite end thereof, whipping mechanism mounted upon said standard, said whipping mechanism comprising a tank to contain the substance to be whipped, said tank being positioned in an offset relation upon and to said standard at the side thereof which is nearest to the midlength of the aforesaid base, a tubular standard carried by said base adjacent the end opposite that which carries the first said standard, and a table top provided with a leg fitted for vertical adjustment in said tubular standard, said tank having an opening in its normally upper side and being turnable about a horizontal axis to direct said opening downwardly for discharging the contents of the tank therethrough into a container supported upon said table top.

10. A whipping machine of the kind described comprising a base, a standard carried by said base, a tank mounted upon said standard, said tank having an opening in its normally upper side and being turnable about a horizontal axis to at times direct said opening downwardly, means for maintaining said tank in its various adjusted positions, said tank being positioned in an offset relation upon and to said standard which is nearest to the midlength of the aforesaid base, and a saddle pivotally connected to said standard for movement to and from a supporting relation to the offset portion of said tank.

11. A whipping machine of the kind described comprising a base, a standard carried by said base, a vertically adjustable tank mounted upon said standard and extending over said base, said tank having a discharge opening in its normally upper side and being turnable about a horizontal axis to at times direct said opening downwardly, means for maintaining said tank in its various adjusted positions, said standard being carried by said base nearer to one than to the opposite end thereof, a tubular standard carried by said base adjacent the end opposite that which carries the first said standard, and a table top mounted for vertical adjustment in said tubular standard below the discharge opening of said tank.

RENWICK J. SHARP.